United States Patent [19]

Gaetano

[11] 4,110,565

[45] Aug. 29, 1978

[54] DUPLEX TELEPHONE SIGNALLING SYSTEM

[75] Inventor: Mauro Luigi Gaetano, Woodbridge, Va.

[73] Assignee: Harvey Hubbell, Incorporated, Orange, Conn.

[21] Appl. No.: 819,434

[22] Filed: Jul. 27, 1977

[51] Int. Cl.² ........................................... H04M 7/02
[52] U.S. Cl. ................................. 179/18 AH; 179/43
[58] Field of Search .................. 179/43, 16 A, 18 AH

[56] References Cited

U.S. PATENT DOCUMENTS 3,610,834  10/1971  Guelgenpfennig ................. 179/43

Primary Examiner—William C. Cooper
Attorney, Agent, or Firm—Jerry M. Presson

[57] ABSTRACT

Disclosed is circuitry interfacing telephone branch or trunk lines to provide D.C. driving voltages in response to, for example, on-hook and off-hook signals from a telephone set. The disclosed circuitry employs both lines to transmit useful signalling information to achieve, substantially, a doubling of the line voltage and a reduction of the common-mode burden on a differential voltage comparator for sensing the signalling information. These results are obtained with lower power dissipation than prior art systems.

3 Claims, 1 Drawing Figure

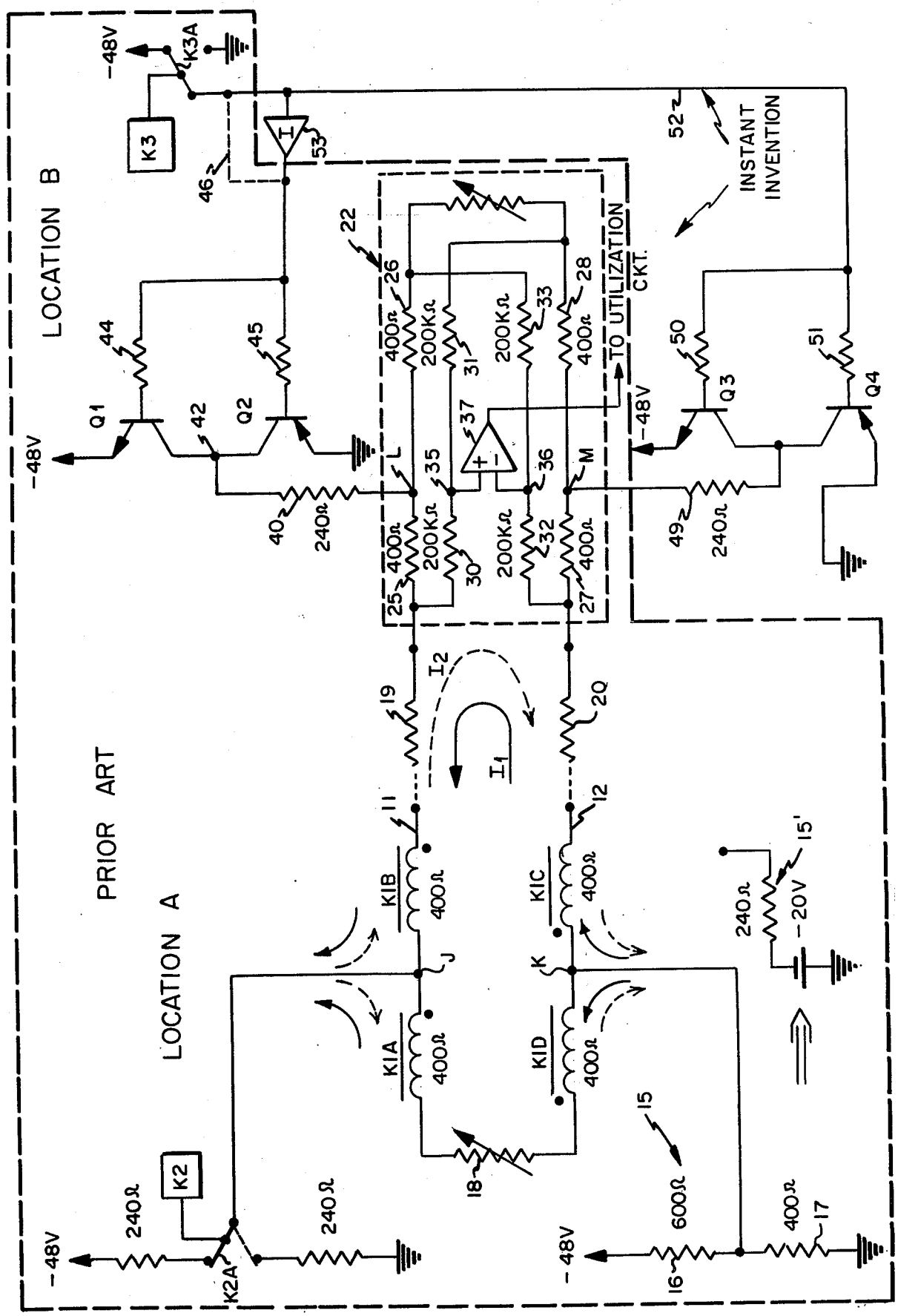

DUPLEX TELEPHONE SIGNALLING SYSTEM

INTRODUCTION

This invention relates to duplex telephone signalling circuits and more particularly to a system for driving the trunk line of a duplex telephone signalling network.

BACKGROUND OF THE INVENTION

Duplex signalling circuits are used extensively between central telephone offices or between a central office and a subscriber station to send and receive electrical signals representing that certain events have occurred at the location. Such an event, for example, would be the detection by the central office of a change in the on-hook or off-hook status of a telephone set at a subscriber station or the reproduction of dialed digits.

Conventional systems of this type use relays and transistors to transmit and receive bilevel D.C. signals between two different network locations which are connected together by a trunk or branch telephone line comprised of two conductors. In a duplex signalling network, the same pair of conductors are used to transmit and to receive signalling information such as supervisory signals between the two locations. Because of the presence of stray leakage currents, the ground potential at one location may be different from that at the other location. Therefore, these systems utilize passive voltage divider circuits formed by resistors of known value to establish an initial bias or reference voltage common to the two locations. The voltage divider circuits which are used for this purpose are typically constituted by two resistors of about 600 ohms and 400 ohms, respectively, connected in a series circuit with one end connected to ground potential and the other end connected to a source of fixed negative potential of typically −48 volts. The negative voltage of about −20 volts appearing at the point in the circuit between the two resistors is applied to one conductor to provide the requisite D.C. potential to the trunk or branch line for proper biasing.

One disadvantage of using a passive voltage divider in these types of duplex systems is that the divider constantly dissipates about 2.5 watts of electrical power. Moreover, the fixed negative voltage applied to the one line by the divider may act in opposition to the bilevel D.C. signalling voltage applied to the other line by a D.C. transmitter to indicate a change in state of a condition in the network at one location. The magnitude of the step D.C. signalling voltage which is available to transmit the information on the other line may be bucked by the reference voltage on the one conductor or line generated by the voltage divider. As will be apparent, this reduces the level of the signalling voltage between the two lines and consequently, limits the distances between the signal transmitting and the signal receiving locations.

In conventional duplex networks, the transmitted signal is detected by a differential relay or electronic comparator coupled across the two conductors of the line and a line balancing network for balancing the line impedance. The differential relay is responsive to currents which are generated by a transmitter at location A at one end of the line which includes a voltage divider circuit, and the current components flowing in the line produced by a transmitter at location B at the opposite end of the line. By suitable adjustment of the balancing network, the flux generated in a receive relay at location A by the current component generated by the location A transmitter is cancelled out by subtraction. On the other hand, the current component flowing in the line generated by the transmitter at location B will aid in generating a flux in the receive relay coils at location A. The polarity of the flux produced depends upon the status of the location B transmitter. The armature of the receive relay at location A will be attracted or repelled depending upon the polarity of the total flux in its coils to change the states of contacts under the control of the relay armature. The electronic comparator essentially performs the same function as the relay, but is responsive to voltage drops across its inputs. The output of the comparator is a voltage level which may be used to drive or control other equipment in the same manner that the relay contacts will perform such functions. Since the relay or comparator input is differential in nature, it has the inherent capability of rejecting common-mode signals. Common-mode signals take the form of two current components of equal magnitude flowing through both line conductors in the same direction. These currents have no effect on the state of the relay or electronic comparator because they have equal cancelling effects on their inputs. Common-mode signals are often referred to by those in the art as "longitudinal signals" to distinguish them from so-called "transversal signals". Transversal signals are the voltage differences between the two respective line conductors, commonly referred to by those in the telephone art as the "tip" and "ring" conductors. The constant voltage generated by the voltage divider circuit appears as a common-mode signal and therefore, diminishes the available margin for rejecting additional common-mode signals induced by other sources, such as power line electromagnetic fields.

SUMMARY OF THE INVENTION

The instant invention employs an active voltage generating circuit in lieu of the conventional passive voltage divider circuit, the active circuit being driven 180 degrees out-of-phase with the step voltage signals produced by the transmitting circuit. In accordance with the disclosed embodiment of this invention, the active circuit is an electronic circuit having its components matched to the electronic components which make up an electronic transmitter so that the signals applied to the differential relay or comparator circuit are of equal magnitude and have a polarity such that the common-mode rejection of the comparator is enhanced. Importantly, since the two circuits are operated 180 degrees out-of-phase, a doubling of the D.C. signal driving voltage is realized or a greater immunity to disturbances can be achieved. Because the signal strength of the information signal is doubled, the distance between the transmitting and receiving locations may be increased. Moreover, this invention is completely compatible with conventional send and receive circuits used in duplex systems. Further, the circuit of this invention is not required to supply continuous power to the divider and therefore, allows substantial reductions in $I^2R$ losses produced by the conventional voltage divider.

OBJECTS OF THE INVENTION

It is an object of this invention to provide an improved duplex telephone signalling system.

Another object of this invention is to provide an active voltage generating circuit for applying D.C. driving signals to telephone branch or trunk lines which substantially increases the magnitudes of transversal signals without exceeding standard battery voltages.

Another object of this invention is to provide an improvement to conventional duplex telephone signalling systems which increases the signalling voltage generated at a transmit location, permits a reduction in the power conventionally required to effect that increase, and reduces the common-mode burden on a differential comparator employed to sense D.C. signalling information.

DETAILED DESCRIPTION

The single sheet of drawing illustrates in schematic circuit diagram form, one embodiment of the instant invention and the state of the known prior art.

A prior art system is depicted within the dashed line block designated PRIOR ART.

With reference to the drawing, a conventional duplex signalling unit comprising a telephone branch or trunk line comprised of two conductors 11 and 12 which connect two locations A and B to receive and transmit signalling information. In accordance with telephone parlance, the conductor 11 is the ring conductor and the conductor 12 is the tip conductor. The locations may be two central telephone offices or a central telephone office and a subscriber telephone installation at location A, a transmit relay K2 actuates a contact arm K2A to connect a junction J to either a battery voltage source of −48 volts or to a source of ground potential, both sources having a fixed voltage-dropping resistor of typically 240 ohms in series therewith.

The relay K2 represents, for example, the state of a telephone set associated with the circuit. When the set is taken from on-hook to off-hook, the contact arm K2A is moved from the position depicted by the solid line to the position depicted by the dash lines. Conversely, when the handset is restored to its hook, the relay restores the contact arm K2A to the solid line position. The junction J is midway between two polarized coils K1A and K1B of a polarized receive relay K1 (not shown). The dots indicate the conventional start of the coil winding so that the currents entering the coils generate positive flux. The receive relay also has other polarized coils K1C and K1D having a midpoint junction K. The K1 relay armature reacts to the direction of the total flux in the coils to change the states of the contacts under the control of the K1 relay armature. These contacts normally operate to initiate or control other circuits or equipment and will be considered as the output carrying the signalling information received from location B.

Connected to the junction K is a conventional passive voltage divider circuit 15 comprising a resistor 16 and a resistor 17 connected in series. The resistor 16 has its upper end connected to a −48 volt battery supply and the resistor 17 has its lower end connected to ground potential. Typical ohmic values for the resistors 16 and 17 are illustrated as 600 ohms and 400 ohms, respectively, however, these values may be varied to suit particular applications. The divider circuit 15 applies a continuous invariant D.C. voltage to the junction K and in accordance with Thevenins theorem is electrically equivalent to the circuit 15 shown to the right in the drawing represented by a battery source of about −20 volts in series with a resistor of 240 ohms. As will be apparent, the divider circuit continuously dissipates approximately 2.5 watts which is a substantial power loss. A variable resistor 18 is connected electrically symmetrical to the line with respect to the K1 relay and is adjusted manually to balance the impedances illustrated by the resistors 19 and 20, respectively, in the lines 11 and 12 until the current components in the coils K1A and K1D and in the coils K1B, K1C due to the local transmitter K2 are equal and therefore, cancel out each other.

The directions of these current component flows through the coils is illustrated by dash and solid lines corresponding to the respective two positions of the switch K2A. The respective net direct current, designated I1 and I2, respectively, is monitored at location B by a conventional comparator or differential relay, portions of which devices are shown encompassed by the dash lines defining block 22.

The nature and operation of this part of the system is well known and is described in a publication entitled "Notes On Distance Dialing" Copyrighted 1975 by The American Telephone And Telegraph Company, New York City, New York.

Once a balanced flux condition is attained in the receive relay coils, the system is conditioned to transmit and receive supervisory signals. The information signals are produced by the application of zero or −48 volts to the junction J by operation of the relay K2. With the divider 15 connected to the line, the junction K floats at about −20 volts with respect to ground potential. The voltage at the junction K normally depends upon the length of the line and therefore, the voltage level at this junction may depart from −20 volts. When −48 volts is applied to the junction J, the transversal voltage will be the difference between the voltages at J and K, or about −28 volts. When the junction J is connected to ground, the transversal voltage will be the voltage at junction K, or about −20 volts. Hence, the signalling tip to ring voltages will change from 28 volts ring negative to 20 volts ring negative. These transversal voltages drive currents IA and IB which are received by a comparator 22 at location B.

The comparator 22 is of conventional type and comprises four resistors 25, 26, 27 and 28 each having the same 400 ohm resistive value as one of the receive coils K1A, K1B, K1C and K1D and four 200 K ohm resistors 30, 31, 32 and 33, interconnected as shown. The resistor 30 has one end connected to the conductor 11 and its opposite end connected to the negative input terminal 35 of an operational amplifier 37. The resistor 32 has one end connected to the conductor 12 and its opposite end connected to the positive input terminal 36 of the amplifier 37. A variable resistor 24 may be adjusted manually to center the output of the comparator at about −7.5 volts with the junctions J and K shorted. When the short is removed, the output of the comparator is about −15 volts when the transversal voltage has the assumed value of about 20 volts ring negative. When the transversal voltage changes to 28 volts ring negative, the output of the comparator has an assumed value of ground potential. These voltage levels are utilized to change the state of conventional receive equipments, such as multiplexers or single frequency (SF) transmitters. Between the resistors 25 and 26 is a junction L to which one end of a resistor 40 of 240 ohm value is connected. The opposite end of the resistor 40 is connected to the midpoint 42 of the collector junctions of a transistor pair Q1 and Q2 of complimentary type.

The transistor Q1 has its emitter junction connected to a −48 volt battery supply whereas the emitter junction of the transistor Q2 is connected to ground potential. The voltage which appears at the junction L is a signal voltage from location B which is applied to the line. In conventional systems, this voltage is generated by operation of a transmit relay K3 which selectively applies −48 volts or ground potential to the bases 44 and 45 of the transistor Q1 and Q2, respectively, through the lead depicted by dash lines 46. The application of −48 volts to the transistor bases 42 and 43 drives the transistor Q1 off and the transistor Q2 on. Conversely, the application of ground to the transistor bases drives the transistor Q1 on and the transistor Q2 off. The resistor 40 at point 42 receives −48 volts when the relay K3 is in one state and zero volts when in the other state, and therefore, the transistors Q1 and Q2 may be substituted for the K2 relay circuit described above. The prior art has employed transistorized transmit circuits similar to the circuit described hereinabove as a substitute for the relay type of the described transmit circuit, and has also used therewith a voltage divider circuit similar to the divider 15 described hereinabove as a means to apply a constant voltage to the junction M of the comparator 22. In such case, a lead connects the junction M to the junction between two resistors arranged in the same manner as the resistors 16 and 17 and the opposite ends are similarly connected to a −48 volt battery and ground, respectively, so that the junction M floats at about −20 volts with respect to ground potential.

Hence, with a divider network similar to the network 15 having the disclosed 600/400 ohm resistance ratio connected to the junction M in the same manner as it is connected to the junction K, the voltage across the conductors 11 and 12 would swing between about 28 volts ring negative and about 20 volts ring negative. As will be apparent, the problem of constant power dissipation by the divider 15 is present with a similar divider connected to the junction M. Further, the common-mode range of the comparator 37 would be partially diminished by the large common-mode signal produced by the divider circuit at junction M. This is so because if the voltage at the junction M floats at a relatively constant average value of, for example, −24 volts, the positive and negative terminals 35 and 36, respectively, of the comparator 37 will see voltage swings between about −12 volts and −36 volts as the junction L swings between −48 volts and ground potential, respectively, of the transistors Q1 and Q2. Assuming the junction M will float at an average voltage level of −24 volts, and the voltage at the junction L range between −48 volts and ground potential. In such case, the voltage on the terminals 35 and 37 will be about −12 volts when ground is applied to lead 46 and will drop 24 volts to about −36 volts when −48 volts are applied to the lead 46. These relatively large swings of voltage at the terminals 35 and 36 require a high common-mode rejection from the comparator 37, which is difficult to achieve with state of the art devices.

In accordance with the instant invention, a passive divider is replaced by an active driving circuit matching the transistors Q1 and Q2 circuit and having the same values of base and collector resistors. The D.C. output of this circuit is applied to the junction M, 180° phase-opposed to the D.C. signal at the junction L. Specifically, there is provided another pair of transistors Q3 and Q4 having their collector junctions connected to the terminal M by a resistor 49 of the same ohmic value as the resistor 40. The transistor Q3 and Q4 are identical to the transistors Q1 and Q2, respectively, and have base resistors 50 and 51 tied together and connected by an input lead 52 to an end of the contact arm K3A. In order to provide a 180° phase-shift between the outputs of two pairs of transistors, inverter 53 is provided having its input connected to the input lead. The emitter of transistor Q3 is connected to a −48 volt battery and the emitter of transistor Q4 is connected to ground. The collectors at both transistors are tied together to one end of the resistor 49 having its opposite end connected to the junction M. As will be apparent, with the inverter 52 in the circuit, the two pairs of transistors now operate 180° out-of-phase with one another so that the transversal voltage between the terminals L and M will now assume values of 48 volts with either negative or positive polarity. Therefore, the D.C. signal voltages are about twice the magnitude they have when a passive divider network is connected to one of the line junctions. Thus, the transmit signal now has about twice the strength compared to prior art systems and assuming all other factors are equal, may be transmitted about twice as far.

Another important advantage which results from the use of the transistors Q3 and Q4 and the inverter 53 is that the common-mode rejection capability of the comparator 37 is enhanced since the signals at junctions L and M produced by the driving circuits also appear at the input terminals 35 and 36. These signals are now of opposite phase but of equal magnitude and are therefore alternately nulled by comparator 37. Importantly, the comparator 37 can be designed to have greater sensitivity to the current components I1 and I2 which are transmitted from location A because it has available a greater accommodation for useful signalling voltages before it reaches saturation. In addition, since the resistor 49 carries only the line current instead of the battery current superimposed on the line current as occurs when the divider circuit is employed, power dissipation by the resistor 49 is substantially reduced. The transistor pairs Q1, Q2 and Q3, Q4 may alternatively have their base junctions connected together in a bistable multivibrator configuration. This can be accomplished by severing the leads connecting the pairs of base resistors together and attaching a lead from the base of transistor Q1 to the base of transistor Q3, and by joining the collector junctions of the two transistor pairs together.

Further, a pair of relay contacts may be used in lieu of the transistor pairs to apply 180° out-of-phase line voltages to the junctions L and M. Various other modifications falling within the spirit and scope of this invention will also suggest themselves to those skilled in the art.

I claim as my invention:
1. A duplex telephone signalling system comprising:
    plural conductors for both transmitting and receiving D.C. signals between two locations,
    first and second devices each having a control input terminal and an output terminal, said devices producing signals at the output terminals thereof in response to control signals at the inputs thereof,
    a switching device responsive to a change of state of telephone equipment at one location for producing the control signal for said first device,
    said first device producing a first D.C. output signal of one polarity at the output terminal thereof in response to said control signal,
    means coupling the control input terminal of said second device to said switching device for invert- ing the polarity of the control signal received by the inverting means, said second device responsive to the inverted control signal for producing a second D.C. output signal at the output terminal thereof of substantially the same absolute magnitude as, but of opposite polarity to, the first D.C. output signal, differential means having plural inputs connected to different ones of said two conductors for detecting the direction of net direct current flow in the conductors at the one location, said differential means producing D.C. outputs representing changes in current direction in said two conductors, and first and second resistors of substantially equal resistance value for connecting each of the outputs of said first and second devices to a different one of the differential means inputs, whereby said differential means rejects said first and second output signals at the one location while such output signals are transmitted by said two conductors to another location.

2. The system according to claim 1 wherein said first and second devices comprise matched pairs of transistors, each pair being of complementary conductivity type and each of said transistors having a base, emitter and collector electrode, the collector electrodes of each pair being connected together at respective first and second terminals, said first and second resistors being connected to respective ones of said first and second terminals and to respective ones of said two conductors at the opposite ends thereof, switch circuitry for connecting the bases of said pair of transistors to said switching device, the inverter means comprising signal inverting circuit connecting said switching device to the base electrodes of said second pair of transistors for inverting the control signal received by said second transistor pair, whereby said first and second resistors apply substantially equal voltages of opposite polarity to the two conductors.

3. The system according to claim 2 wherein said differential means comprises a differential amplifier circuit having positive and negative input terminals.

third and fourth resistors of substantially equal resistance value, each coupled at one end thereof to a different one of the input terminals of the amplifier circuit and at an opposite end thereof to a respective one of said two conductors, and wherein fifth and sixth resistors of substantially equal resistance values connect the opposite ends of said third and fourth resistors to the opposite ends of said first and second resistors, respectively.

* * * * *